Dec. 20, 1938.　　　G. L. KOTHNY　　　2,140,914
MEASURING DEVICE
Filed July 29, 1932
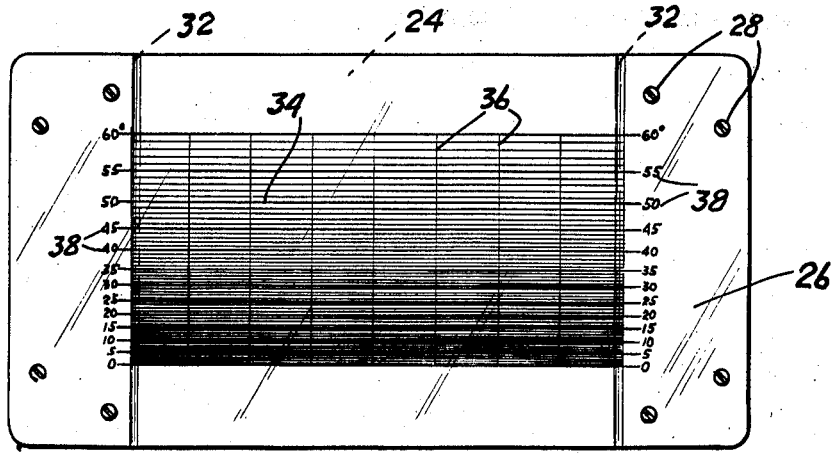
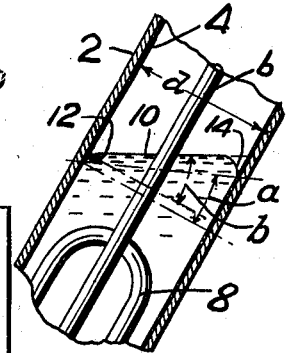
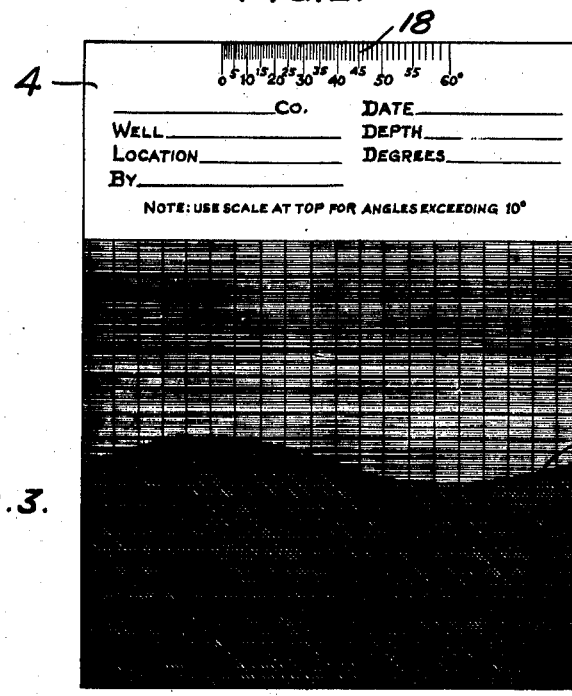
INVENTOR
Gottdank L. Kothny
BY
ATTORNEYS.
WITNESS:

Patented Dec. 20, 1938

2,140,914

UNITED STATES PATENT OFFICE 2,140,914

MEASURING DEVICE

Gottdank L. Kothny, Strafford, Pa., assignor to Sperry-Sun Well Surveying Company, Philadelphia, Pa., a corporation of Delaware Application July 29, 1932, Serial No. 625,843

5 Claims. (Cl. 33—1)

This invention relates to a measuring device designed for use in combination with an inclination recording instrument for determining the deviation of bore holes from the vertical, which instrument includes a cylindrical record sheet designed to be marked by the surface of a liquid. Specifically, the invention relates to a scale adapted to be used in connection with a well surveying instrument of the type described and claimed in the application of William E. Winn, Ser. No. 391,723, filed Sept. 11, 1929.

In this Winn application, there is provided a record chamber of cylindrical form arranged to receive a sheet of record paper in position closely fitting the walls to form an inner cylindrical recording surface. Devices are provided for controlling the flow of ink into this recording chamber from a supply chamber and for thereafter emptying the recording chamber. When the instrument is in position within a bore hole, the ink will enter the recording chamber, rise to a predetermined point, and then flow out, so that there is left upon the cylindrical recording paper surface a sinuous curve, the amplitude of which will give an indication of the slope of the instrument. The sinuous curve, which is thus produced as the trace on the developed cylindrical surface of the surface of the liquid during recording, does not indicate, in any very direct fashion, the slope of the bore hole at the time the record is made, although the slope of the bore hole may be approximated by the inclination of the sinuous curve to a datum line perpendicular to an element of the cylinder at the point of inflexion. A more satisfactory method of determining the inclination corresponding to the obtained sinuous curve is to measure the swing of the curve and calculate from this the corresponding slope, making allowances for the meniscus of the surface of the liquid which is dependent upon the slope, the diameter of the cylinder, the character of the recording surface, and the surface tension of the liquid, as will be pointed out in full in the following description.

It is the object of the present invention to provide means whereby the inclination of the bore hole may be read directly from the sinuous curve without the necessity for calculation. In its preferred form, this means consists of a transparent, plane member which may be superposed upon the record formed on the developed record sheet. This scale, in this preferred form, consists of a series of parallel lines suitably spaced and indexed so that measurement may be made of the swing of the sinuous record and the inclination read directly from the lines tangent to the peaks of the record.

In another form of the invention, the scale is carried by an edge of the record sheet, which may be used to measure the swing of the record formed on another record sheet, the graduations of this scale corresponding to those of the one above mentioned. Preferably, the record sheets, in those instances where measurement is performed by the application of a scale of another record sheet, are provided with equally spaced rulings, so that for small angles of inclinations the inclination may be determined directly by observing the number of lines between the upper and lower peaks of the traced curve superposed thereover. This is possible, inasmuch as, in approximately the first 10 degrees, the devisions corresponding to individual degrees of inclination are substantially equal.

Further objects, relating particularly to details of construction, will be apparent from the following description read in conjunction with the accompanying drawing, in which—

Fig. 1 is a plan view of a preferred form of device.

Fig. 2 is a vertical section therethrough.

Fig. 3 is a plan view of a preferred form of record paper constituting another form of the device.

Fig. 4 is a fragmentary sectional view illustrating a portion of a well surveying apparatus and indicating the type of corrections necessitated by the surface tension of the liquid.

Referring first to Fig. 4, there is illustrated therein a portion of the inner casing of a well surveying instrument of the type described in the Winn application, consisting of a portion 2 of the recording chamber, which is cylindrical in form and which receives, in close engagement with its walls, a record sheet 4. Liquid, preferably an ink, is delivered to the record chamber through the discharge leg of a siphon 6, while liquid is discharged from the chamber following the production of a record by a siphon, a portion of which is indicated at 8. The arrangement is preferably such that the siphon 6 delivers liquid to the record chamber at a rate greater than the discharge from the record chamber by the siphon 8, so that the liquid, which does not begin to flow from the record chamber until it is above the level of the bend of the siphon 8, will rise substantially above the bend of this siphon to form the record. This arrangement is desirable, since, when the instrument is of the necessary compact form, the bend of the siphon 8 takes up a considerable portion of the cross-sectional area of the record chamber; and, if the surface of the liquid at the time the record was made, was not above this bend, there would be errors in the record due to surface tensional phenomena caused by the upper portion of the discharge siphon.

The conditions existing at the time a record is made are approximately illustrated in Fig. 4, in which the surface of the ink is indicated at 10; the meniscus existing at its contact with the recording surface 4 being illustrated, in section, at 12 and 14. The central, substantially plane surface of the liquid surface 10 is horizontal, and, accordingly, the angle $b$ is the true angle of inclination of the instrument from the vertical, being measured between the plane of the surface 10 and a plane perpendicular to the axis of the cylinder. The trace, however, does not correspond to this angle but rather corresponds to the angle $a$ between the plane perpendicular to the axis of the cylinder and a line joining the intercepts of the plane, in which inclination occurs, with the line of contact of the meniscus of the liquid with the recording surface. That is, if 16 of Fig. 3 represents the sinuous curve left on the developed record sheet by the surface of the liquid, its swing, i. e. the distance between the tangents at its positive and negative peaks, will be equal to $d \cdot \tan a$ rather than $d \cdot \tan b$, which it would be if there were no surface tension.

It may be noted that the meniscus at 14 is larger than that at 12, and, consequently, except for very small inclinations to the vertical, the angle $a$ is appreciably different from the angle $b$. The swing of the curve 16, which is, in a sense, double its amplitude and is used, in this sense, in the specification and claims, obviously depends upon the diameter $d$. Furthermore, particularly for small values of $d$, the variations of the meniscus are also dependent upon $d$. Accordingly, any calculations which must be made to determine the inclination corresponding to a particular record curve must take into account the diameter of the cylinder formed by the record sheet, the inclination, the character of the surface of the record sheet, and the surface tension of the ink or other recording liquid—the two latter conditions determining the meniscus.

In accordance with the present invention, the sheet 4, which is preferably of such size that the edges substantially abut without overlapping when it is bent into a cylindrical form in the record chamber, is provided with a scale 18 graduated in accordance with the empirically determined swings of the record curve corresponding to various slopes of the instrument. Readings of this scale from the zero line correspond to the internal diameter $d$ of the cylinder formed by the record paper, times the tangent of the angle $b$, corrected for surface tension, as indicated above. The angles indicated on the scale are the angles of inclination. By taking unused record paper and measuring the distance between upper and lower tangents to the sinuous curve on another record paper, there may be read directly the inclination of the instrument at the time the record is made.

Since for small angles the tangent of an angle is approximately equal to the angle measured in radians and since the meniscus is substantially uniform about the whole cylinder, the degree spacings, up to 10 degrees on the scale, are approximately equal. In the majority of surveys, the deviation of a bore hole from the vertical is of an order less than 10 degrees. Accordingly, it is convenient to rule the record paper, as indicated at 20, with lines spaced to correspond to degrees of inclination less than 10. When paper of this sort is used, if the record corresponds to an inclination less than 10 degrees, the inclination may be directly read without the application of the scale 18 by merely noting the number of lines of the ruling 20 between the uppermost and lowermost peaks of the curve.

As indicated in Fig. 3, the record paper is preferably provided with blanks for the insertion of data concerning the observations, together with such instructions as may be desirable: for example, as indicated, an instruction to use the scale 18 for angles exceeding 10 degrees.

A more convenient method of translating the sinuous record into terms of inclination comprises the use of the device illustrated in Figs. 1 and 2. This consists of a base 22, in the upper surface of which is provided a passageway 24, the width of which corresponds to the width of a record sheet 4. Secured to the base 22 is a transparent member 26 of Celluloid, or the like, secured thereto by small screws 28, or other suitable means. The passageway 24 is preferably bevelled at its ends so as to facilitate the insertion of a record paper into the passageway below the member 26. Longitudinally extending grooves 32, at the edges of the passageway, are provided to receive any dirt or lint which may accumulate and which might tend to jam the passageway, which is preferably such as not to provide any great freedom for vertical movement of the sheet.

The transparent plate 26 has engraved on its lower surface a scale 34 consisting of transverse lines, the spacings of which correspond precisely with the spacings of the scale 18. Vertical lines 36 promote ease of reading. The lines 34 are suitably designated, as indicated at 38, by the angles of the slope to which they correspond; these indications also being preferably engraved on the transparent plate. The engravings 34 and 36 are preferably on the bottom of the plate, and the spacing of the plate above the bottom of the passageway 32 is a minimum; both of these provisions being made to avoid errors due to parallax.

In cases where the device of Figure 1 is used, it is preferable that the rulings 20 be omitted from the record sheet to avoid confusion of these lines with the lines of the scale. The record sheet is inserted within the passageway until the bottom of the curve 16 is tangent to the zero line of the scale; any parallax being avoided by pressing the transparent plate 26 downwardly, which is readily possible when this plate is made of Celluloid or similar material. The vertical edge of the record paper is lined up against one of the edges of the passageway to secure a definite alignment. By then noting the line 34 tangent to the top of the curve 16, a direct indication of the angle of inclination will be obtained. In the type of scale which is illustrated, which is substantially full size in the drawing and is designed to be used with an instrument having an internal diameter of the paper cylinder equal to 1.235 inches, readings may be made to approximately one-quarter of a degree by the use of a magnifying glass. This accuracy is obtained by the use of a smooth recording paper and an ink which will produce a record curve thereon of sharp outline.

It will be clear that numerous variations may be made in the details of the embodiment of the invention without departing from the spirit thereof, as defined in the following claims.

What I claim and desire to protect by Letters Patent is:

1. A measuring device designed for use in conjunction with an inclination record which comprises a cylindrical record sheet designed to be marked by the surface of a liquid, said device comprising a base and a transparent plane member carried by the base, said base providing a guide for a developed record sheet to locate it in predetermined position relative to said member, the member having a scale thereon which, when used to measure the swing of the sinuous record formed on a developed record sheet, will indicate directly the inclination to the vertical of the axis of the cylinder formed by the record sheet when the record was made.

2. A measuring device designed for use in conjunction with an inclination record which comprises a cylindrical record sheet designed to be marked by the surface of a liquid, said device comprising a base and a transparent plane member carried by the base, said base having a passageway formed therein below the member to receive a developed record sheet to locate it in predetermined position relative to said member, the member having a scale thereon which, when used to measure the swing of the sinuous record formed on a developed record sheet, will indicate directly the inclination to the vertical of the axis of the cylinder formed by the record sheet when the record was made.

3. A measuring device designed for use in conjunction with an inclination record which comprises a cylindrical record sheet designed to be marked by the surface of a liquid, said device comprising a base and a transparent plane member carried by the base, said base having a passageway formed therein below the member to receive a developed record sheet to locate it in predetermined position relative to said member, the member having a scale thereon which, when used to measure the swing of the sinuous record formed on a developed record sheet, will indicate directly the inclination to the vertical of the axis of the cylinder formed by the record sheet when the record was made, said base having grooves therein along the sides of the passageway for the reception of dirt or the like.

4. A measuring device comprising a base and a transparent plane member having a scale thereon carried by the base, said base having a passageway formed therein below the member to receive a record sheet to locate it in predetermined position relative to said member, said base having grooves therein along the sides of the passageway for the reception of dirt or the like.

5. A measuring device comprising a base and a transparent plane member having a scale thereon carried by the base, said base having a passageway formed therein below the member to receive a record sheet to locate it in predetermined position relative to said member, said base having grooves therein along the sides of the passageway for the reception of dirt or the like, and said passageway having a flaring record sheet receiving end.

GOTTDANK L. KOTHNY.